US012759475B2

(12) United States Patent
Kim et al.

(10) Patent No.: US 12,759,475 B2
(45) Date of Patent: Oct. 13, 2026

(54) APPARATUS AND METHOD FOR CONTROLLING POP-UP SPEAKER, AND VEHICLE INCLUDING THE SAME

(71) Applicants: Hyundai Motor Company, Seoul (KR); Kia Corporation, Seoul (KR)

(72) Inventors: Dong Jin Kim, Seoul (KR); Seung Woo Lee, Incheon (KR); Young Sun Choi, Suwon-Si (KR); Jae Ok Lee, Seongnam-Si (KR); Hae Young Kwon, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 175 days.

(21) Appl. No.: 18/798,684

(22) Filed: Aug. 8, 2024

(65) Prior Publication Data

US 2025/0162512 A1 May 22, 2025

(30) Foreign Application Priority Data

Nov. 21, 2023 (KR) ........................ 10-2023-0162479

(51) Int. Cl.
*B60R 11/02* (2006.01)
*H04R 1/02* (2006.01)
*B60R 11/00* (2006.01)

(52) U.S. Cl.
CPC .......... *B60R 11/0217* (2013.01); *H04R 1/026* (2013.01); *B60R 2011/0082* (2013.01); *B60R 2011/0092* (2013.01); *H04R 2499/13* (2013.01)

(58) Field of Classification Search
CPC ......... B60R 11/0217; B60R 2011/0082; B60R 2011/0092; H04R 1/026; H04R 2499/13
USPC .......... 381/86; 296/107.13, 107.14; 181/141, 181/143; 224/929
See application file for complete search history.

(56) References Cited

U.S. PATENT DOCUMENTS 5,321,760 A * 6/1994 Gray ...................... H04R 1/026 381/86
2012/0128194 A1* 5/2012 Oh ...................... B60R 11/0217 381/386
2015/0343961 A1* 12/2015 Yu .......................... H04R 1/025 381/389
2022/0141562 A1* 5/2022 Beauregard ......... B60R 11/0217 381/86
2025/0153636 A1* 5/2025 Kominato .............. B60Q 5/008

OTHER PUBLICATIONS

Whit Ford, Polynomials and VEX Drive Motor Control, Feb. 2023.*

* cited by examiner

*Primary Examiner* — William A Jerez Lora
(74) *Attorney, Agent, or Firm* — MORGAN, LEWIS & BOCKIUS LLP

(57) ABSTRACT

In a pop-up speaker control technology capable of reducing noise and vibration generated upon an operation of a pop-up speaker, the pop-up speaker control apparatus includes a driving module configured to pop up or down the pop-up speaker in response to control of an external device, and a processor operatively connected to the driving module and configured to control the driving module in response to a control from the external device, and the processor can control the driving module to operate the pop-up speaker nonlinearly.

17 Claims, 4 Drawing Sheets

APPARATUS AND METHOD FOR CONTROLLING POP-UP SPEAKER, AND VEHICLE INCLUDING THE SAME

CROSS REFERENCE TO RELATED APPLICATION

The present application claims priority to Korean Patent Application No. 10-2023-0162479 filed on Nov. 21, 2023, the entire contents of which is incorporated herein for all purposes by this reference.

BACKGROUND OF THE PRESENT DISCLOSURE

Field of the Present Disclosure

The present disclosure relates to control of a pop-up speaker, and more specifically, to a control apparatus and method that can reduce noise and vibration generated when a pop-up speaker operates, and a vehicle including the same.

Description of Related Art

Vehicles are provided with speakers to implement an audio system. These speakers may be provided in a fixed manner, but may also be provided in a pop-up manner for operating the speakers in a pop-up and pop-down manner.

The conventional pop-up speakers operate linearly when being popped up and down, and a position of the pop-up speaker increases or decreases in proportion to a time. However, a large moment is required to initially operate the pop-up speaker in a stationary state. Furthermore, a rapid decrease in moment is required to stop the pop-up speaker in a pop-up or pop-down state.

When there is a large change in an operating moment of the pop-up speaker, such as when the pop-up speaker is initially driven or when the pop-up speaker is stopped, noise and vibration may be generated.

Therefore, a method of reducing noise and vibration generated during an operation of the pop-up speaker is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and method for controlling a pop-up speaker, which can reduce noise and vibration generated during an operation of the pop-up speaker, and a vehicle including the same.

The present disclosure is also intended to provide an apparatus and method for controlling a pop-up speaker, which can reduce noise and vibration generated when the pop-up speaker operates initially, and a vehicle including the same.

The present disclosure is also intended to provide an apparatus and method for controlling a pop-up speaker, which can reduce noise and vibration generated when the pop-up speaker is stopped, and a vehicle including the same.

The present disclosure is also intended to provide an apparatus and method for controlling a pop-up speaker, which can reduce noise and vibration generated upon an initial pop-up operation and a stop operation of the pop-up speaker, and a vehicle including the same.

The present disclosure is also intended to provide an apparatus and method for controlling a pop-up speaker, which can reduce noise and vibration generated upon an initial pop-down operation and a stop operation of the pop-up speaker, and a vehicle including the same.

The technical object of the present disclosure is not limited to the matters described above, and from the following description, anyone skilled in the art to which the present disclosure pertains will be able to clearly understand other objects intended by the present disclosure.

As a technical solution for achieving the above-described technical object, an apparatus and method for controlling a pop-up speaker, which can reduce noise and vibration generated when the pop-up speaker operates, and a vehicle including the same may be provided.

According to one aspect, there is provided a pop-up speaker control apparatus including a driving module configured to pop up or down the pop-up speaker in response to control of an external device, and a processor operatively connected to the driving module and configured to control the driving module in response to the control from the external device.

According to various exemplary embodiments of the present disclosure, the processor is configured for controlling the driving module to operate the pop-up speaker nonlinearly.

According to various exemplary embodiments of the present disclosure, the processor is configured for controlling the pop-up speaker according to a control curve with different characteristics based on a time point corresponding to a preset predetermined ratio of an overall operation of the pop-up speaker.

According to various exemplary embodiments of the present disclosure, the processor is configured for controlling the pop-up speaker according to a first control curve in a first control section from an operation start time point of the pop-up speaker to a predetermined time point 50% of the overall operation and control the pop-up speaker according to a second control curve in a second control section from the predetermined time point 50% of the overall operation of the pop-up speaker to a stop time point of the pop-up speaker.

According to various exemplary embodiments of the present disclosure, the first control curve may be defined by Equation 1, and the second control curve may be defined by Equation 2:

$$y = \frac{[y_{max}]}{[x_{max}]^2} * x^2 + \frac{1}{2} * \frac{[y_{max}]}{[x_{max}]} * x\left(0 \le x \le \frac{[x_{max}]}{2}\right) \quad \text{[Equation 1]}$$

$$y = -\frac{[y_{max}]}{[x_{max}]^2} * x^2 + \frac{5}{2} * \frac{[y_{max}]}{[x_{max}]} * x - \frac{1}{2} * [y_{max}]\left(\frac{[x_{max}]}{2} \le x \le [x_{max}]\right) \quad \text{[Equation 2]}$$

(Here, $x_{max}$ means a maximum ratio when an overall time required for the pop-up speaker to complete the operation of the pop-up speaker is converted into a ratio, and x means a ratio of a time required for the pop-up speaker to move to a current height compared to the maximum ratio of the required time. Furthermore, $y_{max}$ means a maximum ratio when a total height change until the pop-up speaker completes the operation is converted into a ratio, and y means a ratio of a current height change of the pop-up speaker compared to the maximum ratio of the total height change)

According to various exemplary embodiments of the present disclosure, an inclination value of gradient of the first control curve may gradually increase, and an inclination value of gradient of the second control curve may gradually decrease.

According to various exemplary embodiments of the present disclosure, the control curve may include a first region, a second region, and a third region, the first region may include a start region of the control curve, the second region includes an end region of the control curve, and the third region may be a region between the first region and the second region.

According to various exemplary embodiments of the present disclosure, an inclination value of gradient of the third region may be greater than an inclination value of gradient of the first region and an inclination value of gradient of the second region.

According to various exemplary embodiments of the present disclosure, the first region may be included in the first control curve, the second region may be included in the second control curve, and the third region may be included ranging between the first control curve and the second control curve.

According to various aspects of the present disclosure, there is provided a pop-up speaker control method including a control operation of popping up the pop-up speaker in response to an operating ON signal received from an external device, or popping down the pop-up speaker in response to an operating OFF signal received from the external device.

According to various exemplary embodiments of the present disclosure, the pop-up speakers may operate non-linearly.

According to various exemplary embodiments of the present disclosure, in the control operation, the pop-up speaker may be controlled according to a control curve with different characteristics based on a time point corresponding to a preset ratio of an overall operation of the pop-up speaker.

According to various exemplary embodiments of the present disclosure, in the control operation, the pop-up speaker may be controlled according to a first control curve in a first control section from an operation start time point of the pop-up speaker to a predetermined time point 50% of the overall operation and may be controlled according to a second control curve in a second control section from the predetermined time point 50% of the overall operation of the pop-up speaker to a stop time point of the pop-up speaker.

According to various exemplary embodiments of the present disclosure, the first control curve may be defined by Equation 1, and the second control curve may be defined by Equation 2:

According to various exemplary embodiments of the present disclosure, an inclination value of gradient of the first control curve may gradually increase, and an inclination value of gradient of the second control curve may gradually decrease.

According to various exemplary embodiments of the present disclosure, the control curve may include a first region, a second region, and a third region, the first region may include a start region of the control curve, the second region includes an end region of the control curve, and the third region may be a region between the first region and the second region.

According to various exemplary embodiments of the present disclosure, an inclination value of gradient of the third region may be greater than an inclination value of gradient of the first region and an inclination value of gradient of the second region.

According to various exemplary embodiments of the present disclosure, the first region may be included in the first control curve, the second region may be included in the second control curve, and the third region may be included ranging between the first control curve and the second control curve.

According to various aspects of the present disclosure, there is provided a vehicle including a pop-up speaker, an operating switch configured to output a signal for turning the pop-up speaker on or off, and a pop-up speaker control apparatus configured to control the pop-up speaker in response to a signal from the operating switch, wherein the pop-up speaker control apparatus may include a driving module configured to pop up or down the pop-up speaker in response to control of an external device, and a processor operatively connected to the driving module and configured to control the driving module in response to the signal, and the processor is configured for controlling the driving module to operate the pop-up speaker nonlinearly.

Specific details according to various examples of the present disclosure other than the solutions for solving the above-described objectives are included in the following description and the accompanying drawings.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
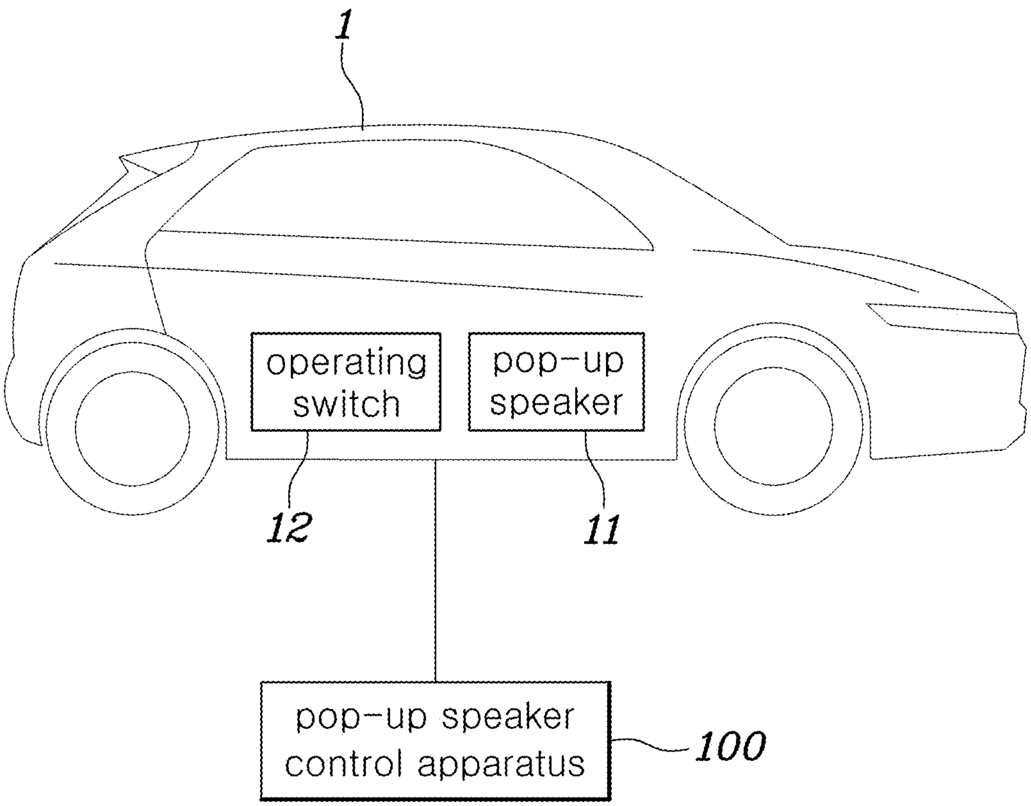
FIG. 1 is a diagram illustrating a vehicle 1 including a pop-up speaker control apparatus 100 according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Advantages, features, and implementations thereof will be apparent from embodiments which are described in detail below together with the accompanying drawings. The present disclosure may, however, be implemented in many different forms and should not be construed as being limited to the exemplary embodiments set forth herein, and the exemplary embodiments are provided so that the present disclosure will be thorough and complete and will fully convey the scope of the present disclosure to those skilled in the art to which the present disclosure pertains, and the present disclosure is defined by only the scope of the appended claims.

Shapes, sizes, ratios, angles, numbers, and the like included in the drawings for describing the exemplary embodiments of the present disclosure are illustrative, and thus the present disclosure is not limited to the illustrated matters. The same reference numerals refer to the same components throughout the present specification. Furthermore, in the following description of the present disclosure, when a detailed description of a known related art is determined to unnecessarily obscure the gist of the present disclosure, the detailed description thereof will be omitted herein. When terms "including," "having," "consisting of," and the like mentioned in an exemplary embodiment of the present disclosure are used, other parts may be added unless a term "only" is used herein. When a component is expressed as a singular number, the plural number is included unless otherwise specified.

In analyzing a component, it is interpreted as including an error range even when there is no explicit description for the error range.

In describing a temporal relationship, when a temporal predecessor relationship is described as being "after," "subsequent," "next to," "prior to," or the like, unless "immediately" or "directly" is not used, cases that are not continuous may also be included.

Although the terms first, second, and the like are used to describe various components, these components are not substantially limited by these terms. These terms are used only to distinguish one component from another component. Therefore, a first component described below may be substantially a second component within the technical spirit of the present disclosure.

In describing components of the present disclosure, the terms first, second, A, B, (a), (b), and the like may be used. These terms are intended to distinguish one component from other components, but the nature, sequence, order, or number of the components is not limited by those terms. When components are disclosed as being "connected," "coupled," or "contacted" to other components, the components may be directly connected or contacted to the other components, but it should be understood that other components may be "interposed" between each component which is indirectly connected or connected without any explicit description.

"At least one" should be understood to include any combination of one or more of related components. For example, "at least one of first, second, and third components" means not only the first, second, or third component, but also all combinations of two or more of the first, second, and third components.

Features of various embodiments of the present disclosure may be partially or entirely coupled or combined with each other and may be technically various interlocking and driving, and the exemplary embodiments of the present disclosure may be independently implemented with respect to each other or implemented together with a correlation.

The scale of the components shown in the drawings is different from an actual scale for convenience of description and is therefore not limited to the scale shown in the drawings.

Hereinafter, a pop-up speaker control apparatus and method according to various exemplary embodiments of the present disclosure, and a vehicle including the same will be described with reference to the accompanying drawings.

FIG. 1 is a diagram illustrating a vehicle 1 including a pop-up speaker control apparatus 100 according to an exemplary embodiment of the present disclosure.

Referring to FIG. 1, the vehicle 1 may include the pop-up speaker control apparatus 100 according to the exemplary embodiment of the present disclosure.

A pop-up speaker 11 is provided in the vehicle 1, and the pop-up speaker control apparatus 100 may be configured for controlling a pop-up operation and a pop-down operation of the pop-up speaker 11.

For example, the pop-up speaker 11 may be provided inside a crash pad of the vehicle 1. The pop-up speaker 11 may be popped up or down under the control of the pop-up speaker control apparatus 100.

According to the exemplary embodiment of the present disclosure, in response to control of an operating switch 12 provided in the vehicle 1, the pop-up speaker control apparatus 100 may be configured for controlling the pop-up speaker 11.

For example, the operating switch 12 may be an ON/OFF control switch of an audio system of the vehicle 1, but the present disclosure is not limited thereto.

The operating switch 12 may output a signal for turning the pop-up speaker 11 on or off. According to the exemplary embodiment of the present disclosure, in response to a manipulation of a user, the operating switch 12 may output an operating ON signal or an operating OFF signal to the pop-up speaker control apparatus 100.

When the operating ON signal output from the operating switch 12 is received, the pop-up speaker control apparatus 100 may be configured for controlling the pop-up operation of the pop-up speaker 11.

For example, when the operating ON signal output from the operating switch 12 is received, the pop-up speaker control apparatus 100 may pop up the pop-up speaker 11 in a pop-down state and move the pop-up speaker 11 to a preset upper fixed point.

When the operating OFF signal output from the operating switch 12 is received, the pop-up speaker control apparatus 100 may be configured for controlling the pop-down operation of the pop-up speaker 11.

For example, when the operating OFF signal output from the operating switch 12 is received, the pop-up speaker control apparatus 100 may pop down the pop-up speaker 11 in a pop-up state and move the pop-up speaker 11 to a preset lower fixed point.

A state in which the pop-up speaker 11 is moved to the preset upper fixed point may be expressed as a "pop-up completion state," an "opened state," and the like, and a state in which the pop-up speaker 11 is moved to the preset lower fixed point may be expressed as a "pop-down completion state," a "closed state," and the like.

According to the exemplary embodiment of the present disclosure, the pop-up speaker control apparatus 100 may be configured for controlling the pop-up speaker 11 based on a pre-stored control algorithm.

The control algorithm is programmed to minimize noise and vibration generated when the pop-up speaker 11 operates. According to the exemplary embodiment of the present disclosure, the control algorithm is programmed to reduce noise and vibration generated upon an initial stage and a stop stage of the pop-up/pop-down operation of the pop-up speaker 11.

Figure 2:
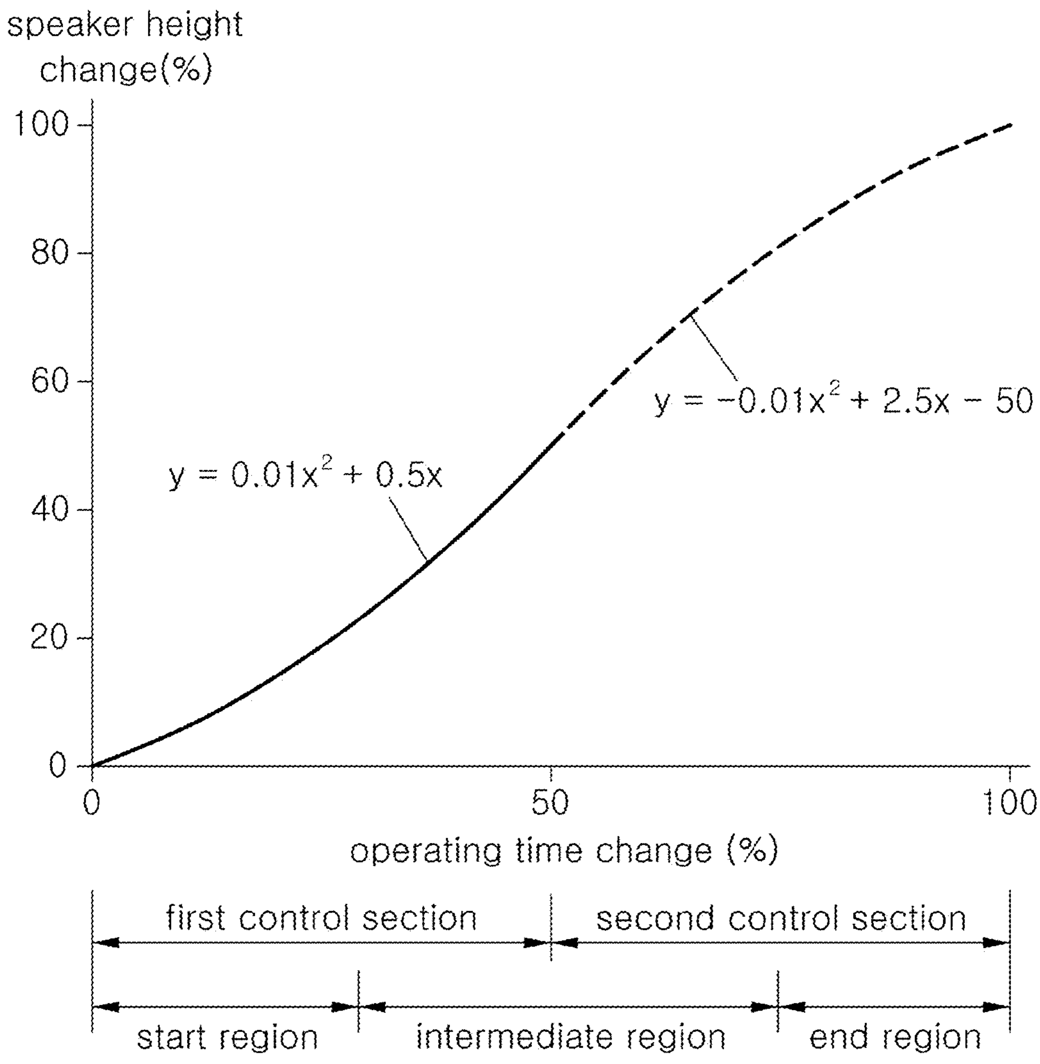
FIG. 2 is a graph showing an example of a control curve according to an exemplary embodiment of the present disclosure.

FIG. 2 is a graph showing an example of a control curve according to an exemplary embodiment of the present disclosure.

The conventional pop-up speaker operates linearly, but the pop-up speaker 11 according to the exemplary embodiment of the present disclosure operates nonlinearly.

The pop-up speaker 11 according to the exemplary embodiment of the present disclosure may operate while following the control curve as shown in FIG. 2.

According to the exemplary embodiment of the present disclosure, the pop-up speaker control apparatus 100 may be configured for controlling the pop-up speaker 11 according to the control curve with different characteristics based on the predetermined time point 50% of the overall operation of the pop-up speaker 11.

In FIG. 2, the graph is shown based on the predetermined time point 50% of the total operation of the pop-up speaker 11, but the criterion may be changed.

That is, the pop-up speaker control apparatus 100 may be configured for controlling the pop-up speaker 11 based on a time point corresponding to a preset specific ratio during the overall operation.

The pop-up speaker control apparatus 100 may be configured for controlling the pop-up speaker 11 according to Equation 1 from an operation start time point of the pop-up speaker 11 to the predetermined time point 50% of the overall operation (first control section) and control the pop-up speaker 11 according to Equation 2 from the predetermined time point 50% of the overall operation of the pop-up speaker 11 to a stop time point (second control section).

According to the exemplary embodiment of the present disclosure, an inclination value of gradient of the control curve in the first control section may gradually increase, and an inclination value of gradient of the control curve in the second control section may gradually decrease.

According to the exemplary embodiment of the present disclosure, the control curve may include a start region (or a first region), an end region (or a second region), and an intermediate region (or a third region).

The start region and the end region of the control curve have gentle inclination value of gradients, and the intermediate region defined between the start region and the end region of the control curve includes an inclination value of gradient which is greater than the inclination value of gradients of the start region and the end region.

According to the exemplary embodiment of the present disclosure, the start region may be included in the first control curve, the end region may be included in the second control curve, and the intermediate region may be included ranging between the first control curve and the second control curve.

Since the start region of the control curve includes the gentle inclination value of gradient, rattle noise occurring in the initial operation of the pop-up speaker 11 may be minimized.

Furthermore, since the end region of the control curve includes the gentle inclination value of gradient, vibration occurring when the pop-up speaker 11 stops may be minimized.

The operation start time point of the pop-up speaker 11 may include a pop-up operation start time point and a pop-down operation start time point, and the stop time point of the pop-up speaker 11 may include a pop-up operation stop time point and a pop-down operation stop time point. Here, the pop-up operation start time point may mean a time point when the pop-up operation of the pop-up speaker 11 starts, the pop-down operation start point may mean a time point when the pop-down operation of the pop-up speaker 11 starts, the pop-up operation stop time point may mean a time point when the pop-up operation of the pop-up speaker 11 stops, and the pop-down operation stop time point may mean a time point when the pop-down operation of the pop-up speaker 11 stops.

That is, the pop-up operation and the pop-down operation of the pop-up speaker 11 may be performed according to the control curve as shown in FIG. 2.

$$y = \frac{[y_{max}]}{[x_{max}]^2} * x^2 + \frac{1}{2} * \frac{[y_{max}]}{[x_{max}]} * x\left(0 \le x \le \frac{[x_{max}]}{2}\right) \quad \text{[Equation 1]}$$

$$y = -\frac{[y_{max}]}{[x_{max}]^2} * x^2 + \frac{5}{2} * \frac{[y_{max}]}{[x_{max}]} * x - \frac{1}{2} * [y_{max}]\left(\frac{[x_{max}]}{2} \le x \le [x_{max}]\right) \quad \text{[Equation 2]}$$

In Equation 1 and Equation 2, $x_{max}$ may mean a maximum ratio (100%) when the overall time required for the pop-up speaker 11 to complete the operation is converted into a ratio, and x may mean a ratio of a time required for the pop-up speaker 11 to move to a current height compared to the maximum ratio of the time required.

Furthermore, $y_{max}$ may mean a maximum ratio (100%) when the total height change until the pop-up speaker 11 completes the operation is converted into a ratio, and y may mean a ratio of a current height change of the pop-up speaker 11 compared to the maximum ratio of the total height change.

The control curve shown in FIG. 2 shows a case in which $x_{max}$ is set to 100 and $y_{max}$ is set to 100 in Equation 1 and Equation 2.

Referring to FIG. 2, the pop-up speaker control apparatus 100 may be configured for controlling the pop-up speaker 11 according to $y=0.01x^2+0.5x$ from the operation start time point of the pop-up speaker 11 to the predetermined time point 50% of the overall operation in the first control section and control the pop-up speaker 11 according to $y=-0.01x^2+2.5x-50$ from the predetermined time point 50% of the overall operation of the pop-up speaker 11 to the stop time point in the second control section.

Of course, the control curve may be changed according to values of $x_{max}$ and $y_{max}$. However, even when the values of $x_{max}$ and $y_{max}$ are changed, the characteristics in which the inclination value of gradient of the control curve of the first control section is gradually increased, and the inclination value of gradient the control curve of the second control section is gradually decreased are not changed.

Figure 3:
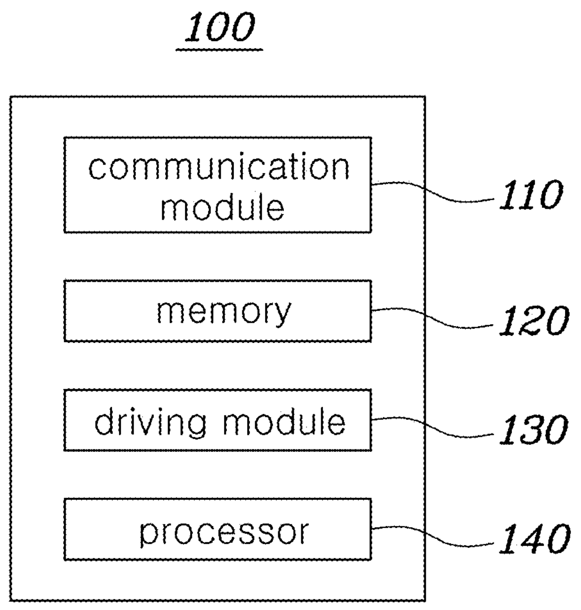
FIG. 3 is a diagram illustrating a configuration of the pop-up speaker control apparatus 100 according to the exemplary embodiment of the present disclosure.

FIG. 3 is a diagram illustrating a configuration of the pop-up speaker control apparatus 100 according to the exemplary embodiment of the present disclosure.

Referring to FIG. 3, the pop-up speaker control apparatus 100 according to an exemplary embodiment of the present disclosure may include a communication module 110, a memory 120, a driving module 130, and a processor 140, and the configuration of the pop-up speaker control apparatus 100 is not limited thereto. The processor 140 may be operatively connected to the communication module 110, the memory 120, and the driving module 130 through an internal bus.

The communication module 110 may transmit and receive data, signal, or the like through communication with an external device. For example, the communication module 110 may include a controller area network (CAN) communication module, a local interconnect network (LIN) communication module, FlexRay communications module, and the like.

According to the exemplary embodiment of the present disclosure, the communication module 110 may receive a signal output from the operating switch 12 and transmit the received signal to the processor 140.

The memory 120 may store a variety of algorithms, data, and the like necessary for the processor 140 to operate.

The memory 120 may include volatile memories and/or non-volatile memories. The volatile memories may include a dynamic random access memory (DRAM), a static RAM (SRAM), a synchronous DRAM (SDRAM), a phase-change RAM (PRAM), a magnetic RAM (MRAM), a resistive RAM (RRAM), and a ferroelectric RAM (FeRAM). The non-volatile memories may include a read only memory (ROM), a programmable ROM (PROM), an electrically programmable ROM (EPROM), an electrically erasable programmable ROM (EEPROM), and a flash memory.

According to the exemplary embodiment of the present disclosure, the memory 120 may store an algorithm for controlling the pop-up speaker 11.

The driving module 130 may provide power for controlling the operation of the pop-up speaker 11 under the control of the processor 140.

The driving module 130 may pop up or down the pop-up speaker 11 under the control of the processor 140.

For example, the driving module 130 may be a motor. For example, the driving module 130 may be configured to generate a moment for controlling the pop-up speaker 11 based on a magnitude size and a direction corresponding to a control signal output from the processor 140.

The processor 140 may perform calculation or data processing related to the control of at least one other component of the pop-up speaker control apparatus 100. For example, the processor 140 may execute the algorithm stored in the memory 120.

The processor 140 may be configured for processing received data and the data stored in the memory 120. The processor 140 may execute computer-readable codes (e.g., algorithm) stored in the memory 120 and instructions generated by the processor 140.

The processor 140 may be a data processing device implemented in hardware which includes a circuit with a physical structure for executing desired operations. For example, the desired operations may include codes or instructions included in a program.

For example, the data processing device implemented in hardware may include a microprocessor, a central processing unit, a processor core, a multi-core processor, a multi-processor, an application-specific integrated circuit (ASIC), and a field programmable gate array (FPGA).

In response to a signal from the operating switch 12, the processor 140 may be configured for controlling the operation of the pop-up speaker 11.

According to the exemplary embodiment of the present disclosure, when an operating ON signal output from the operating switch 12 is received, the processor 140 may be configured for controlling the pop-up operation of the pop-up speaker 11.

For example, when the operating ON signal output from the operating switch 12 is received, the processor 140 may pop up the pop-up speaker 11 being in a pop-down state and move the pop-up speaker 11 to a preset upper fixed point.

According to the exemplary embodiment of the present disclosure, when an operating OFF signal output from the operating switch 12 is received, the processor 140 may be configured for controlling the pop-down operation of the pop-up speaker 11.

For example, when the operating OFF signal output from the operating switch 12 is received, the processor 140 may pop down the pop-up speaker 11 being in a pop-up state and move the pop-up speaker 11 to a preset lower fixed point.

The processor 140 may be configured for controlling the operation of the pop-up speaker 11 based on a control algorithm pre-stored in the memory 120.

According to the exemplary embodiment of the present disclosure, the processor 140 may be configured for controlling the pop-up speaker 11 according to a control curve with different operating characteristics in a first control section from an operation start time point of the pop-up speaker 11 to the predetermined time point 50% of the overall operation and a second control section from the predetermined time point 50% of the overall operation of the pop-up speaker 11 to a stop time point.

In the instant case, an inclination value of gradient of the control curve in the first control section may gradually increase, and an inclination value of gradient of the control curve in the second control section may gradually decrease.

According to the exemplary embodiment of the present disclosure, the control curve in the first control section may be defined by Equation 1 described above, and the control curve in the second control section may be defined by Equation 2 described above.

The processor 140 may be configured for controlling the pop-up speaker 11 based on the control curve defined by Equation 1 and Equation 2.

Figure 4:
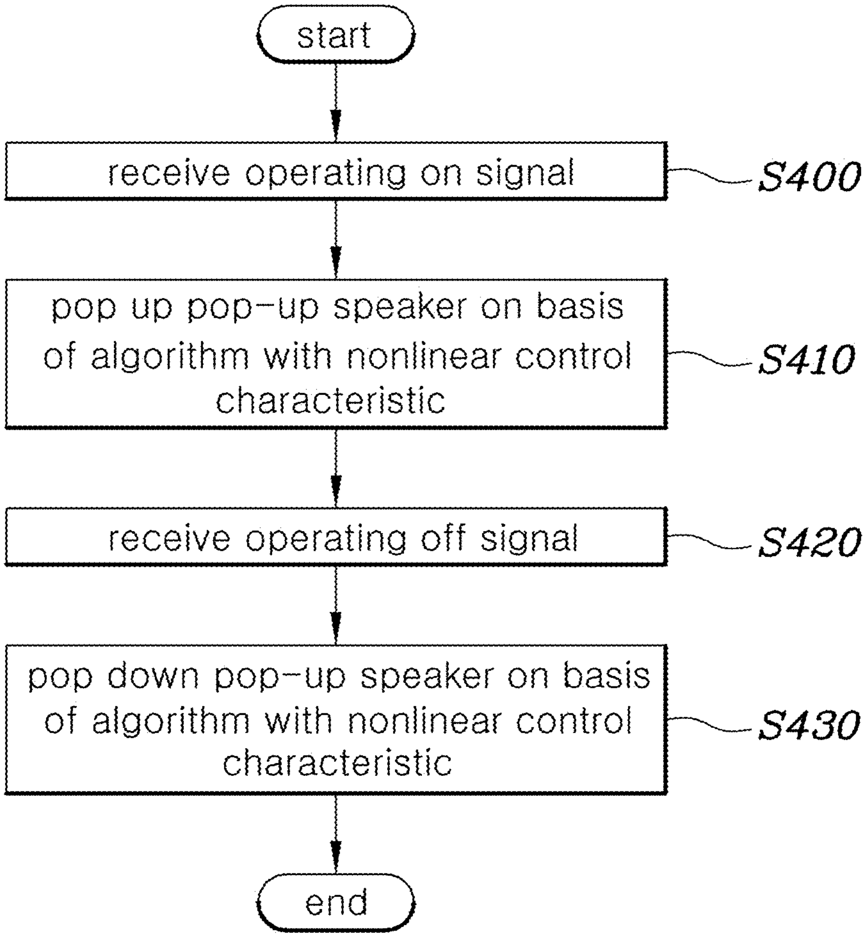
FIG. 4 is a flowchart for describing a pop-up speaker control method according to an exemplary embodiment of the present disclosure.

FIG. 4 is a flowchart for describing a pop-up speaker control method according to an exemplary embodiment of the present disclosure.

Operations shown in FIG. 4 may be performed by the pop-up speaker control apparatus 100 described with reference to FIG. 1, FIG. 2, and FIG. 3.

Referring to FIG. 1, FIG. 2, FIG. 3, and FIG. 4, when an operating ON signal output from the operating switch 12 is received (S400), the pop-up speaker control apparatus 100 may pop up the pop-up speaker 11 according to a pre-stored control algorithm (S410).

In operation S410, the pop-up speaker control apparatus 100 may pop up the pop-up speaker 11 being in a pop-down state and move the pop-up speaker 11 to a preset upper fixed point.

In operation S410, the pop-up speaker control apparatus 100 may be configured for controlling the pop-up speaker 11 based on the control curve as shown in FIG. 2.

In an exemplary embodiment of the present disclosure, the pop-up speaker control apparatus 100 may move the pop-up speaker 11 with an inclination that gradually increases in the start region, perform linear control with a predetermined inclination in the intermediate region to move the pop-up speaker 11, and move the pop-up speaker 11 with an inclination that gently decreases in the end region.

Thereafter, when the operating OFF signal output from the operating switch 12 is received (S420), the pop-up speaker control apparatus 100 may pop down the pop-up speaker 11 according to the pre-stored control algorithm (S430).

In operation S430, the pop-up speaker control apparatus 100 may pop down the pop-up speaker 11 in a pop-up state and move the pop-up speaker 11 to a preset lower fixed point.

In operation S430, the pop-up speaker control apparatus 100 may be configured for controlling the pop-up speaker 11 based on the control curve as shown in FIG. 2.

The pop-up speaker control apparatus 100 may move the pop-up speaker 11 with an inclination that gradually increases in the start region, perform linear control with a predetermined inclination in the intermediate region to move the pop-up speaker 11, and move the pop-up speaker 11 with an inclination that gently decreases in the end region.

In accordance with the exemplary embodiments of the present disclosure, an apparatus and method for controlling a pop-up speaker, which can reduce noise and vibration generated when the pop-up speaker operates may be provided.

In accordance with the exemplary embodiments of the present disclosure, an apparatus and method for controlling a pop-up speaker, which can reduce noise and vibration generated upon an initial operation and a stop operation of the pop-up speaker may be provided.

In accordance with the exemplary embodiments of the present disclosure, an apparatus and method for controlling a pop-up speaker, which can reduce noise and vibration generated upon an initial pop-up and pop-down operation and a stop operation of the pop-up speaker may be provided.

By use of a pop-up speaker control technology according to the exemplary embodiments of the present disclosure, noise and vibration generated during the operation of the pop-up speaker may be reduced.

In accordance with the exemplary embodiments of the present disclosure, a vehicle to which a pop-up speaker control technology configured for reducing noise and vibration generated upon the operation of the pop-up speaker is applied may be provided.

When the pop-up speaker control technology according to the exemplary embodiments of the present disclosure is applied to a vehicle, noise and vibration generated upon the operation of a pop-up speaker mounted on the vehicle may be reduced, and the marketability of the vehicle and audio system may be improved.

It should be noted that effects of the present disclosure are not limited to the above-described effect, and other effects not mentioned of the present disclosure will be apparent to those skilled in the art from the appended claims.

Because the contents of the problem to be solved, the solution for solving the problem, and the effects described above do not specify the essential features of the appended claims, the scope of the appended claims is not limited by matters described in the contents of the present disclosure.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling an operation of a pop-up speaker provided in a vehicle, the apparatus comprising:

a driving module configured to pop up or down the pop-up speaker in response to control of an operating switch; and a processor operatively connected to the driving module and the operating switch and configured to control the driving module in response to a control from the operating switch, wherein the processor is further configured to control the driving module to operate the pop-up speaker nonlinearly in the control of the operating switch, and wherein the processor is further configured to control the pop-up speaker according to a control curve with different characteristics based on a time point corresponding to a preset ratio of an overall operation of the pop-up speaker.

2. The apparatus of claim 1, wherein the control curve includes a first control curve and a second control curve, and wherein the processor is further configured to control the pop-up speaker according to the first control curve in a first control section from an operation start time point of the pop-up speaker to a predetermined time point of the overall operation and is configured to control the pop-up speaker according to the second control curve in a second control section from the predetermined time point of the overall operation of the pop-up speaker to a stop time point of the pop-up speaker.

3. The apparatus of claim 2, wherein the predetermined time point is 50% of the overall operation.

4. The apparatus of claim 2, wherein the first control curve is defined by Equation 1, and the second control curve is defined by Equation 2:

$$y = \frac{[y_{max}]}{[x_{max}]^2} * x^2 + \frac{1}{2} * \frac{[y_{max}]}{[x_{max}]} * x\left(0 \le x \le \frac{[x_{max}]}{2}\right), \quad \text{[Equation 1]}$$

$$y = -\frac{[y_{max}]}{[x_{max}]^2} * x^2 + \frac{5}{2} * \frac{[y_{max}]}{[x_{max}]} * x - \frac{1}{2} * [y_{max}]\left(\frac{[x_{max}]}{2} \le x \le [x_{max}]\right), \quad \text{[Equation 2]}$$

wherein $x_{max}$ means a maximum ratio when an overall time required for the pop-up speaker to complete the operation of the pop-up speaker is converted into a ratio, and x means a ratio of a time required for the pop-up speaker to move to a current height compared to a maximum ratio of the required time and, $y_{max}$ means a maximum ratio when a total height change until the pop-up speaker completes the operation is converted into a ratio, and y means a ratio of a current height change of the pop-up speaker compared to a maximum ratio of the total height change.

5. The apparatus of claim 2, wherein an inclination value of gradient of the first control curve increases, and an inclination value of gradient of the second control curve decreases.

6. The apparatus of claim 2, wherein the control curve includes a first region, a second region, and a third region, wherein the first region includes a start region of the control curve, wherein the second region includes an end region of the control curve, wherein the third region is a region between the first region and the second region, and wherein an inclination value of gradient of the third region is greater than an inclination value of gradient of the first region and an inclination value of gradient of the second region.

7. The apparatus of claim 6, wherein the first region is included in the first control curve, the second region is included in the second control curve, and the third region is included ranging between the first control curve and the second control curve.

8. A method of controlling an operation of a pop-up speaker provided in a vehicle, the method comprising:

a control operation of popping up the pop-up speaker in response to an operating ON signal received from an operating switch, or popping down the pop-up speaker in response to an operating OFF signal received from the operating switch, wherein the pop-up speaker operates nonlinearly in the responses to the operating ON signal and the operating OFF signal, and wherein, in the control operation, the pop-up speaker is controlled according to a control curve with different characteristics based on a time point corresponding to a preset ratio of an overall operation of the pop-up speaker.

9. The method of claim 8, wherein the control curve includes a first control curve and a second control curve, and wherein, in the control operation, the pop-up speaker is controlled according to the first control curve in a first control section from an operation start time point of the pop-up speaker to a predetermined time point of the overall operation and the pop-up speaker is controlled according to the second control curve in a second control section from the predetermined time point of the overall operation of the pop-up speaker to a stop time point of the pop-up speaker.

10. The method of claim 9, wherein the predetermined time point is 50% of the overall operation.

11. The method of claim 9, wherein the first control curve is defined by Equation 1, and the second control curve is defined by Equation 2:

$$y = \frac{[y_{max}]}{[x_{max}]^2} * x^2 + \frac{1}{2} * \frac{[y_{max}]}{[x_{max}]} * x\left(0 \le x \le \frac{[x_{max}]}{2}\right), \quad \text{[Equation 1]}$$

-continued $$y = -\frac{[y_{max}]}{[x_{max}]^2} * x^2 + \frac{5}{2} * \frac{[y_{max}]}{[x_{max}]} * x - \frac{1}{2} * [y_{max}]\left(\frac{[x_{max}]}{2} \le x \le [x_{max}]\right). \quad \text{[Equation 2]}$$

wherein $x_{max}$ means a maximum ratio when an overall time required for the pop-up speaker to complete an operation of the pop-up speaker is converted into a ratio, and x means a ratio of a time required for the pop-up speaker to move to a current height compared to a maximum ratio of the required time, and wherein $y_{max}$ means a maximum ratio when a total height change until the pop-up speaker completes the operation is converted into a ratio, and y means a ratio of a current height change of the pop-up speaker compared to a maximum ratio of the total height change.

12. The method of claim 9, wherein an inclination value of gradient of the first control curve increases, and an inclination value of gradient of the second control curve decreases.

13. The method of claim 9, wherein the control curve includes a first region, a second region, and a third region, wherein the first region includes a start region of the control curve, wherein the second region includes an end region of the control curve, wherein the third region is a region between the first region and the second region, and wherein an inclination value of gradient of the third region is greater than an inclination value of gradient of the first region and an inclination value of gradient of the second region.

14. The method of claim 13, wherein the first region is included in the first control curve, the second region is included in the second control curve, and the third region is included ranging between the first control curve and the second control curve.

15. A vehicle, comprising:

a pop-up speaker;

an operating switch configured to output a signal for turning the pop-up speaker on or off; and a pop-up speaker control apparatus including a processor and configured to control the pop-up speaker to operate the pop-up speaker nonlinearly, wherein the pop-up speaker control apparatus further includes a driving module operatively connected to the processor and configured to pop up or down the pop-up speaker nonlinearly in response to control of an operating switch, and wherein the processor is further configured to control the pop-up speaker according to a control curve with different characteristics based on a time point corresponding to a preset ratio of an overall operation of the pop-up speaker.

16. The vehicle of claim 15, wherein the control curve include a first control curve and a second control curve, and wherein the processor is further configured to control the pop-up speaker according to the first control curve in a first control section from an operation start time point of the pop-up speaker to a predetermined time point of the overall operation and is configured to control the pop-up speaker according to the second control curve in a second control section from the predetermined time point of the overall operation of the pop-up speaker to a stop time point of the pop-up speaker.

17. The vehicle of claim 15, wherein the control curve includes a first region, a second region, and a third region, wherein the first region includes a start region of the control curve, wherein the second region includes an end region of the control curve, wherein the third region is a region between the first region and the second region, and wherein an inclination value of gradient of the third region is greater than an inclination value of gradient of the first region and an inclination value of gradient of the second region.

* * * * *